Oct. 4, 1932.  G. R. WOOD  1,880,639
SCALE
Filed Feb. 3, 1931  2 Sheets-Sheet 2
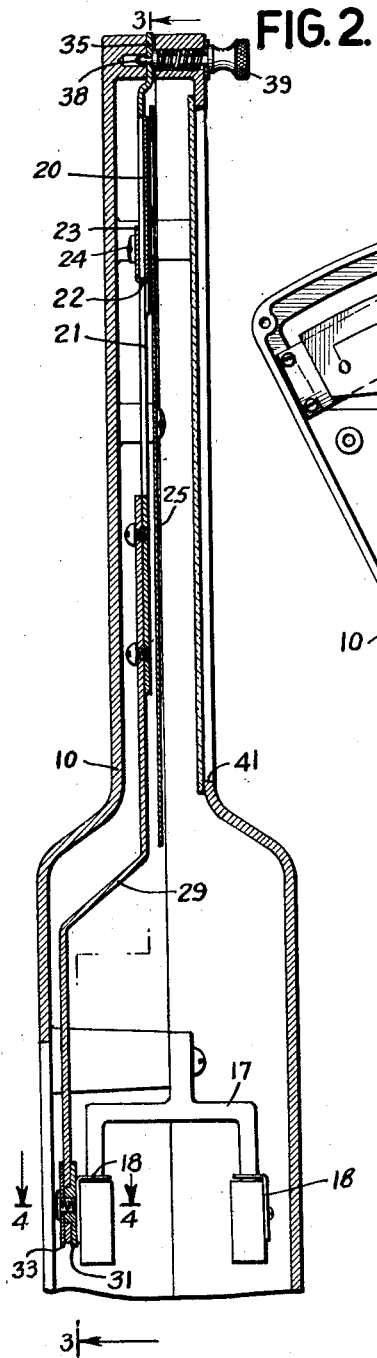
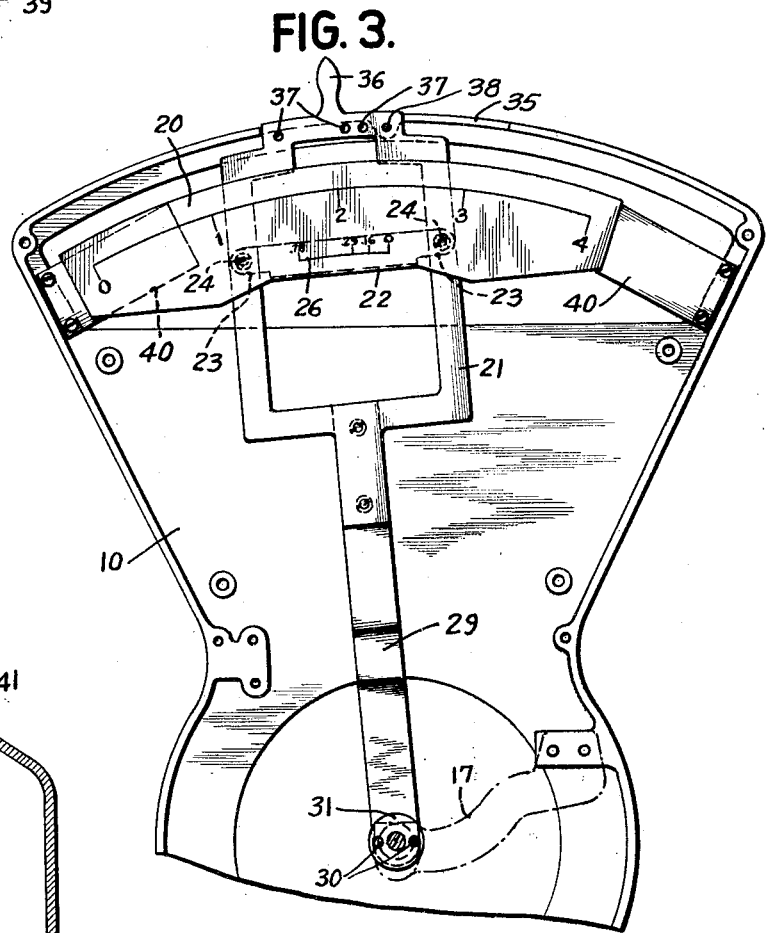
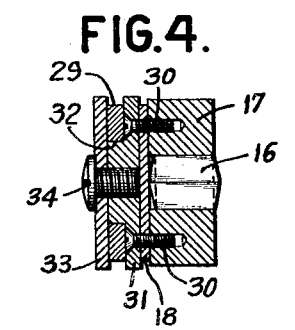
INVENTOR
Geo. R. Wood
BY ATTORNEY
Wm Wilson Patented Oct. 4, 1932

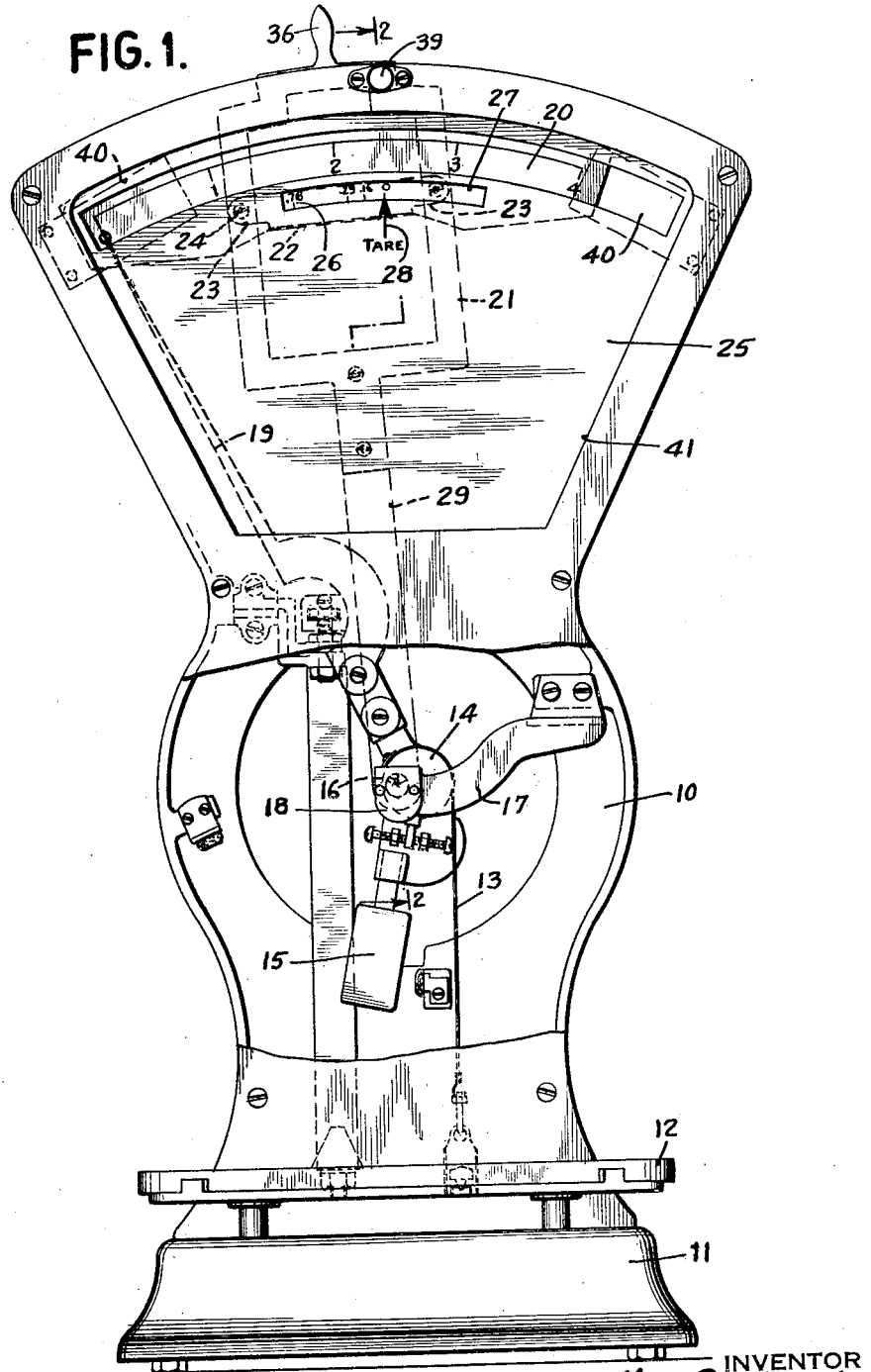

1,880,639

UNITED STATES PATENT OFFICE

GEORGE R. WOOD, OF TORONTO, ONTARIO, CANADA, ASSIGNOR TO DAYTON SCALE COMPANY, OF DAYTON, OHIO, A CORPORATION OF NEW JERSEY

SCALE

Application filed February 3, 1931. Serial No. 513,117.

The present invention relates to weighing scales and particularly to scales designed to compensate for tares.

The primary object of the invention is to provide a novel and improved tare compensating arrangement which is simple in its construction and manipulation, less subject to erroneous manipulation and may be cheaply manufactured and assembled.

Various other objects, advantages, or features of the present invention will be pointed out in the following specification and claims or will be apparent from a study thereof and of the accompanying drawings which illustrate one form which the invention may have.

In the drawings:

Fig. 1 is a front elevation of a scale embodying the present invention.

Fig. 2 is a vertical section taken substantially on the line 2—2 in Fig. 1, some of the parts having been omitted for sake of clearness.

Fig. 3 is a vertical section taken substantially on the line 3—3 in Fig. 2.

Fig. 4 is a detail view in horizontal section taken substantially on the line 4—4 in Fig. 2.

The reference character 10 indicates the main frame of the scale which also serves as a housing for the weighing mechanism and is provided with a base 11 which contains the usual lever system operated by a load support such as the platform 12. Displacements of the lever system under the influence of a load placed upon the platform 12 are communicated to the usual pendulum system by means of a flexible tape 13 which is connected to the pendulum cam 14 rigid with a pendulum 15. The pendulum cam 14 and the pendulum 15 are mounted upon pivot elements 16 carried in sockets formed in the free ends of a bifurcated frame piece 17 rigidly fastened to the frame 10.

Suitable guards 18, mounted adjacent the pivot elements 16, prevent said elements from being accidentally displaced and also prevent the pivot elements of the pendulum system from being jarred out of engagement with the elements 16. Movable with the pendulum system is a pointer 19 which extends upwardly in cooperative relation with the dial or chart 20, the latter being provided with a series of weight graduations cooperating with the pointer 19.

The present invention contemplates providing novel means for subtracting tares from the chart readings whereby the actual load in or on the container may be directly read from the chart by the pointer in a simple and efficient manner without requiring manipulation of weights, springs or other types of load offsetting elements for the tare. In order to accomplish the foregoing result, the chart or dial 20 is made movable relative to the casing and is arranged to be manually displaceable proportionately to the tares to be offset.

The dial 20 is rigidly mounted upon a manually shiftable member 21 which is pivotally mounted adjacent one of the pivot elements 16, as will be described in detail hereinafter, and has the general form of a rectangular open frame. It will be observed that the dial 20 is formed of a single piece of sheet metal which is folded as at 22 and has two offset lugs 23 formed in the folded portion which extend upwardly and laterally in the rear of the vertical parts of the rectangular frame 21 and are fastened to said frame by means of screws 24. The construction just described is advantageous because the line of fold 22 stiffens the dial 20 and also permits the dial to be placed as close as possible to the mask 25 which conceals all of the mechanism except the extreme upper end of the pointer 19, the weight graduations on the chart, and the tare graduations 26 which are placed on the dial 20 and are visible through a suitable opening 27 formed in the mask 25. A suitable index or mark 28 in the mask 25 adjacent the opening 27 cooperates with the graduations 26 so that the dial 20 may be shifted to the left (Fig. 1) to bring any desired tare into co-incidence with the index 28.

The tares shown in Figs. 1 and 3 have been arbitrarily shown as of the values .16 lb., .29 lb., and .78 lb., respectively, and represent the weights of various sizes of containers for the material weighed. The tares selected for illustrating the invention represent the weights of spools used to receive wire but it is obvious that other tares might be used or a simple weight scale might be provided instead, according to the desire of the purchaser of the scale.

The frame 21 is fastened to the upper end of a member 29 the lower end of which is pivotally mounted adjacent the rear pivot element 16 in a manner shown in detail in Fig. 4. The rear guard 18 is mounted behind the rear pivot element 16 by means of two flat head screws 30 which also pass through diametrically opposite holes in a disk 31 having a central boss or hub 32 upon which the lower end of the member 29 is loosely pivoted. A disk 33 and a screw 34 prevent the member 29 from slipping off the hub 32 but permit free pivotal movement of the member 29 on the hub 32.

It is desirable that means be provided to manipulate the dial 20 and also to hold it in its manually set positions. The frame 10 is provided with a slot 35 through which extends a portion of the frame 21, the latter having a handle 36 formed therein by means of which the dial 20, frame 21 and member 29 may be shifted as a unit to the right or to the left (Figs. 1 and 2) to bring any desired tare graduation 16 into register with the index 28. The portion of frame 21 lying in the slot 35 is provided with four holes 37 arranged to cooperate with a spring pressed plunger 38 slidably mounted in the frame 10. A suitable knob 39 permits manual withdrawal of the plunger 38 from the particular hole with which it happens to be cooperating thereby permitting shifting of the dial 20 to a new position in the manner previously mentioned.

The free ends of the dial 20 are steadied and guided by means of wing plates 40 which extend in the rear of the free ends of the dial 20 and also serve to close the unsightly opening or space which would otherwise appear at each end of the weight scale. It will be understood that a suitable pane of glass closes the opening 41 in the front of the scale and prevents dust from accumulating on the parts inside of the frame 10 while other panes of glass close the various openings provided to permit a view of the mechanism as is usual in the scale art.

The principle advantages of the present invention are the simplicity of the parts which permits their manufacture and assembly to be very cheaply effected, the ease of manipulation, and the avoidance of any necessity for the operator to manipulate weights or other devices as is usually the case. The single dial or chart structure carrying both the weight graduations and the tare graduations further does away with the necessity of providing several separate charts as was formerly the case. The tare compensating arrangement has no direct physical connection with any movable part of the weighing mechanism proper and therefore can impose no additional load thereon.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

I claim:

1. A scale having a load support, weighing mechanism actuated thereby, a pointer displaceable by the weighing mechanism proportionately to the weight of the load, a dial having two series of graduations proportional to weight, one of said series cooperating with the pointer and adapted to indicate the weight of the contents of a container, the other series representing the tares of various containers, an index cooperating with the last named series, and a support for said dial having an element for manually shifting the dial and its support to bring any desired one of the graduations representing tares into register with the index.

2. A scale having weighing mechanism, a pointer displaceable by said mechanism proportionately to weight, a dial having a main series of graduations representing weight cooperating with said pointer and a series of graduations representing tares, a fixed index cooperating with the tare graduations, and means for shifting the dial relative to the index to bring any desired tare graduation into register with the index and thereby automatically subtract the tare reading from the main series of graduations.

3. A scale having a load support, weighing mechanism actuated thereby, a pivoted pointer displaceable by the weighing mechanism proportionately to weight, a dial having a series of graduations proportional to weight cooperating with the pointer, a support for said dial, said support having a pivot concentric with the pivot for the pointer and an element for shifting the dial and its support about the pivot for the support increments proportional to tares, and manually releasable means for holding the dial and its support in shifted position comprising a manually operable plunger arranged to register in a hole in said support.

4. A scale having weighing mechanism, a pointer displaceable by said mechanism proportionately to weight, a dial cooperating with said pointer and having a series of graduations representing weight and a series of graduations, representing tares, a fixed index cooperating with the tare graduations, means for shifting the dial relative to the index to bring any desired tare graduation into register with said index, and means for holding the dial in its shifted position comprising a manually shiftable plunger adapted to register in a hole fixed relative to the dial.

5. A scale having weighing mechanism, a pointer controlled thereby and displaceable proportionately to weight, a dial having a series of graduations representing weight cooperating with the pointer and a series of graduations represting tares, an element having a mark adapted to cooperate with said tare graduations, and means for shifting the dial relative to said mark to bring any desired tare into register with said mark.

6. A scale having weighing mechanism, a pointer displaceable by said mechanism proportionately to weight, a dial having a series of graduations proportional to weight and cooperating with the pointer and a series of graduations representing tares, an index adapted to cooperate with said tare graduations, said dial being shiftable relative to said index to bring any desired tare into register with the index, and means for retaining the dial in shifted position.

7. A scale having weighing mechanism, a member provided with a series of weight graduations and a separate series of graduations representing tares, an indicator coacting with the first named weight graduations, said indicator and said member being movable relative to each other by the weighing mechanism to indicate weight, a second indicator cooperating with the graduations representing tares, and means for at will moving said member and said indicators relative to each other whereby to subtract the tare from the weight indicated by the first named indicator.

8. A scale having weighing mechanism, a member provided with a series of weight graduations and a series of graduations representing tares, an indicator cooperating with the weight graduations, said indicator and said member being movable relative to each other by the weighing mechanism to indicate the weight of the load, a second indicator cooperating with the tare graduations, means for manually shifting said member and said indicators relative to each other to subtract tares from the total weight of the load, and means releasable at will for retaining said members and indicators in manually shifted position.

9. In combination, weighing mechanism and indicating mechanism actuated thereby comprising a member provided with weight graduations and tare graduations, indexes for reading said weight and tare graduations, respectively, and manual means for shifting the indexes and said member relative to each other whereby to subtract tares from the total weight indicated by the first named graduations.

In testimony whereof I hereto affix my signature.

GEORGE R. WOOD.